US011827068B2

(12) United States Patent
Sugawara et al.

(10) Patent No.: US 11,827,068 B2
(45) Date of Patent: Nov. 28, 2023

(54) STABILIZER AND METHOD OF MANUFACTURING SAME

(71) Applicant: NHK SPRING Co., Ltd., Yokohama (JP)

(72) Inventors: Masato Sugawara, Kanagawa (JP); Shogo Mori, Kanagawa (JP)

(73) Assignee: NHK SPRING CO., LTD., Yokohama (JP)

(*) Notice: Subject to any disclaimer, the term of this patent is extended or adjusted under 35 U.S.C. 154(b) by 250 days.

(21) Appl. No.: 17/117,763

(22) Filed: Dec. 10, 2020

(65) Prior Publication Data

US 2021/0094379 A1    Apr. 1, 2021

Related U.S. Application Data

(63) Continuation of application No. PCT/JP2019/023020, filed on Jun. 11, 2019.

(30) Foreign Application Priority Data

Jun. 12, 2018 (JP) ................. 2018-111904

(51) Int. Cl.
*B60G 21/055* (2006.01)
*B21K 7/12* (2006.01)
*B21K 21/12* (2006.01)

(52) U.S. Cl.
CPC ............ *B60G 21/0551* (2013.01); *B21K 7/12* (2013.01); *B21K 21/12* (2013.01);
(Continued)

(58) Field of Classification Search
CPC .......... B60G 21/0551; B60G 2202/135; B60G 2206/427; B60G 2206/81022;
(Continued)

(56) References Cited

U.S. PATENT DOCUMENTS 4,781,054 A    11/1988  Brown et al.
2001/0004149 A1    6/2001  Fujiki et al.
(Continued)

FOREIGN PATENT DOCUMENTS

CN    106794739 A    5/2017
EP    0436407 A1    7/1991
(Continued)

OTHER PUBLICATIONS

International Search Report for International Application No. PCT/JP2019/023020; dated Jul. 30, 2019.
(Continued)

*Primary Examiner* — Jason D Shanske
*Assistant Examiner* — Daniel M. Keck
(74) *Attorney, Agent, or Firm* — CANTOR COLBURN LLP (57) ABSTRACT

A stabilizer comprises a main bar that is elastically deformable, a pair of connecting plates respectively configured to be connected to a pair of left and right suspension apparatuses, and transition sections connecting both end portions of the main bar and the pair of connecting plates, a size of one transition section of the transition sections in a plate thickness direction of one connecting plate of the connecting plates gradually decreasing from the main bar toward the connecting plate, wherein the minimum value of the Vickers hardness of the transition section is 200 HV or more.

8 Claims, 5 Drawing Sheets

(52) U.S. Cl.
CPC .. *B60G 2202/135* (2013.01); *B60G 2206/427* (2013.01); *B60G 2206/81022* (2013.01)

(58) Field of Classification Search
CPC ........ B60G 2202/13; B60G 2206/8103; B60G 21/055; B21K 7/12; B21K 21/12; B21K 21/14; Y02P 10/25; B21D 41/045; B21D 53/88; C21D 1/62; C21D 1/673; C21D 1/40; C21D 1/42; C21D 2261/00; C21D 9/08; C21D 9/085; C21D 8/105; C21D 2221/00; C21D 2221/01; B29K 29/00
See application file for complete search history.

(56) References Cited

U.S. PATENT DOCUMENTS

| | | |
|---|---|---|
| 2007/0074940 A1 | 4/2007 | Narishima et al. |
| 2012/0318409 A1 | 12/2012 | Mizuno et al. |
| 2013/0113175 A1 | 5/2013 | Renner et al. |
| 2014/0223743 A1* | 8/2014 | Frehn .................. B60G 21/055 29/897.2 |
| 2017/0066299 A1 | 3/2017 | Mucher et al. |
| 2017/0349962 A1 | 12/2017 | Kuwatsuka et al. |
| 2018/0029435 A1 | 2/2018 | Nagano et al. |
| 2019/0030980 A1* | 1/2019 | Tange .................. B60G 21/055 |

FOREIGN PATENT DOCUMENTS

| | | | |
|---|---|---|---|
| EP | 3279015 A1 | 2/2018 | |
| JP | H07237428 A | 9/1995 | |
| JP | H08141691 A | 6/1996 | |
| JP | 2001165127 A | 6/2001 | |
| JP | 2005262261 A | 9/2005 | |
| JP | 2005319850 A | 11/2005 | |
| JP | 2006132711 A | 5/2006 | |
| JP | 2007014978 A | 1/2007 | |
| JP | 2015188927 A | 11/2015 | |
| JP | 2017170490 A | 9/2017 | |
| JP | 2018047909 A | 3/2018 | |
| KR | 20080055076 A | 6/2008 | |
| KR | 20090022459 A | 3/2009 | |
| KR | 101713544 B1 * | 3/2017 | |
| WO | WO-2016152240 A1 * | 9/2016 | .......... B60G 21/055 |
| WO | 2017170787 A1 | 10/2017 | |

OTHER PUBLICATIONS

JPO Notice of Reasons for Refusal for corresponding JP Application No. 2018-111904; dated Jun. 7, 2022.

EPO Extended Search Report for corresponding EP Application No. 19819578.6; dated Nov. 2, 2021.

CNIPA Search Report for corresponding CN Application No. 2019800394875; dated Mar. 27, 2023.

CNIPA Notice of Allowance corresponding to CN Application No. 201980039487.5; dated Aug. 16, 2023.

Shao Fang-yuan, "Analysis on stability of pressure-bearing drill in upward reverse drilling", China Master's Theses Full-text Database, Engineering Technology I, Second Journal, Feb. 15, 2018, 81 pages.

* cited by examiner

STABILIZER AND METHOD OF
MANUFACTURING SAME

CROSS-REFERENCE TO PRIOR
APPLICATIONS

This application is a continuation under 35 U.S.C. § 120 of PCT/JP2019/023020, filed Jun. 11, 2019, which is incorporated herein reference and which claimed priority to Japanese Application No. 2018-111904, filed Jun. 12, 2018. The present application likewise claims priority under 35 U.S.C. § 119 to Japanese Application No. 2018-111904, filed Jun. 12, 2018, the entire content of which is also incorporated herein by reference.

TECHNICAL FIELD

The present invention relates to a stabilizer and a method of manufacturing the same.

In the related art, for example, the following Patent Document 1 discloses a stabilizer including a main bar that is elastically deformable, a pair of connecting plates respectively configured to be connected to a pair of left and right suspension apparatuses, and transition sections connecting both end portions of the main bar to the pair of connecting plates, sizes of the transition sections in a plate thickness direction of the connecting plates gradually decreasing from the main bar toward the connecting plates. In such a stabilizer, for example, when a vehicle turns or the like and the displacement amounts of the pair of left and right suspension apparatuses are different from each other, displacement of the vehicle in a roll direction is minimized through torsional deformation and bending deformation of the main bar within an elastic region.

A method of manufacturing a stabilizer includes a heating process of heating sections in a rod body intended to be formed into connecting plates to a temperature equal to or greater than an A1 transformation point, and a forging process of molding connecting plates by performing forging on the sections intended to be formed into the connecting plates. In the forging process, following the molding of the connecting plates from the sections intended to be formed into the connecting plates, the sections intended to be formed into the transition sections are deformed and formed into the transition sections.

DOCUMENTS OF THE RELATED ART

Patent Documents

Patent Document 1

US Patent Application Publication No. 2017/0066299

SUMMARY OF THE INVENTION

However, in the stabilizer in the related art, the hardness of transition sections is lower than that of other portions in a rod body, and connecting portions between connecting plates and the transition sections may be damaged.

In consideration of the above-mentioned circumstances, the present invention is directed to provide a stabilizer which is capable of minimizing damage to connecting portions between connecting plates and transition sections and a method of manufacturing the same.

In order to solve the above-mentioned problems and achieve the above objective, a stabilizer of a first aspect of the present invention includes a main bar that is elastically deformable; a pair of connecting plates respectively configured to be connected to a pair of left and right suspension apparatuses; and transition sections connecting both end portions of the main bar and the pair of connecting plates, a size of one transition section of the transition sections in a plate thickness direction of one connecting plate of the connecting plates gradually decreasing from the main bar toward the connecting plate, wherein the minimum value of the Vickers hardness of the transition section is 200 HV or more.

According to the first aspect of the present invention, since the minimum value of the Vickers hardness of the transition section is 200 HV or more, differences in hardness between the transition sections and the connecting plates are minimized. For this reason, when a vehicle having a stabilizer in which the connecting plates are connected to the suspension apparatuses travels, even though stress is concentrated on the connecting portions between the connecting plates and the transition sections, damage to the portions can be minimized.

In the stabilizer of the above-mentioned first aspect, the minimum value of the Vickers hardness of the connecting plate may be 150 HV or more, and the outer diameters of end portions of the main bar may be 2.5 times or more and 10 times or less the thicknesses of the connecting plates.

In this case, the minimum value of the Vickers hardness of the connecting plate is 150 HV or more and the outer diameters of the end portions of the main bar are 2.5 times or more and 10 times or less the thicknesses of the connecting plates. For this reason, according to the fact that the differences in hardness between the transition sections and the connecting plates are minimized, when the vehicle having the stabilizer in which the connecting plates are connected to the suspension apparatuses travels, even though stress is concentrated on the connecting portions between the connecting plates and the transition sections, it is possible to reliably minimize damage on the connecting portions.

In addition, in a method of manufacturing a stabilizer according to a second aspect of the present invention, the stabilizer comprises a main bar that is elastically deformable; a pair of connecting plates respectively configured to be connected to a pair of left and right suspension apparatuses; and transition sections connecting both end portions of the main bar and the pair of connecting plates, a size of one transition section of the transition sections in a plate thickness direction of one connecting plate of the connecting plates gradually decreasing from the main bar toward the connecting plate, the method comprising: a heating process of heating sections of a rod body intended to be respectively formed into the connecting plate and the transition section to a temperature of an A1 transformation point or more; and a forging process of molding the connecting plate by performing forging on the section intended to be formed into the connecting plate, wherein the connecting plate is molded while the section intended to be formed into the transition section is cooled during the forging process.

According to the second aspect of the present invention, the connecting plate is molded while the section intended to be formed into the transition section, which is heated to the temperature of the A1 transformation point or more during the heating process, is cooled during the forging process. For this reason, the transition section can be rapidly cooled while the connecting plate is molded through forging, quenching can be performed on the transition section, and the hardness of the transition sections can be increased. Accordingly, it is possible to obtain a stabilizer in which the connecting portions between the connecting plates and the transition sections cannot be easily damaged. Moreover, since the quenching can be performed on the transition section during the forging process performed in the related art, a decrease in production efficiency can be prevented.

Incidentally, when the rod body has a tubular shape, during the forging process, the section intended to be formed into the connecting plate is compressed in the radial direction, and the inner circumferential surface of the section intended to be formed into the connecting plate is molded as a set of surfaces that overlap each other. For this reason, when the connecting plate is cooled, a gap may be formed between the set of surfaces.

However, during the forging process, since the connecting plate is restrained by the forging molds in the plate thickness direction, in this process, even if not only the section intended to be formed into the transition section but also the molded connecting plate is cooled, formation of a gap can be minimized.

Further, during the forging process, when not only the transition section but also the connecting plate is rapidly cooled, quenching is also performed on the connecting plate, and the hardness of the connecting plate can be increased. In this case, in a state in which a through-hole passing through the connecting plate in the plate thickness direction is formed in the connecting plate and a bolt attached to the stabilizer is inserted through the through-hole, formation of cracks in an inner circumferential surface of the through-hole can be minimized.

In the method of manufacturing the stabilizer according to the second aspect, during the forging process, the section intended to be formed into the transition section may be cooled by bringing cooling bodies having temperatures lower than that of the section intended to be formed into the transition section into contact with at least connecting portion of a section intended to be formed into the main bar of the rod body to the section intended to be formed into the transition section.

In this case, during the forging process, when the section intended to be formed into the transition section is cooled, the cooling bodies contact with at least the section of the rod body intended to be formed into the main bar that is relatively difficult to deform. For this reason, it is possible to prevent contacting states of the cooling bodies with respect to the rod body from being different for each forged rod body. In addition, here, since the cooling bodies contact the connecting portion of the section intended to be formed into the main bar to the section intended to be formed into the transition section, distances between the cooling bodies and the section intended to be formed into the transition section can be minimized, and the section intended to be formed into the transition section can be effectively cooled.

In addition, in the method of manufacturing the stabilizer according to the second aspect, the cooling bodies may be provided on forging molds that mold the connecting plate, and may protrude from the forging molds toward the section intended to be formed into the main bar.

In this case, since the cooling bodies are provided on the forging molds, during the forging process, the cooling bodies and the forging molds can be driven integrally, and complication of the forging mold apparatus can be minimized.

In addition, in the method of manufacturing the stabilizer according to the second aspect, during the forging process, the section intended to be formed into the transition section may be cooled by cooling the forging molds that mold the connecting plate.

In this case, during the forging process, since the section intended to be formed into the transition section is cooled by cooling the forging molds that mold the connecting plate, when heat of the section intended to be formed into the connecting plate and the transition section is transferred to the forging molds, this heat can be removed to keep the temperatures of the forging molds uniform. Accordingly, it is possible to prevent the temperature of the section intended to be formed into the transition section after cooling during the forging process from being different for each forged rod body, and the hardness of the transition section can be made equal for each manufactured stabilizer.

According to the present invention, it is possible to minimize damage to a connecting portion between a connecting plate and a transition section.

DETAILED DESCRIPTION

Figure 1:
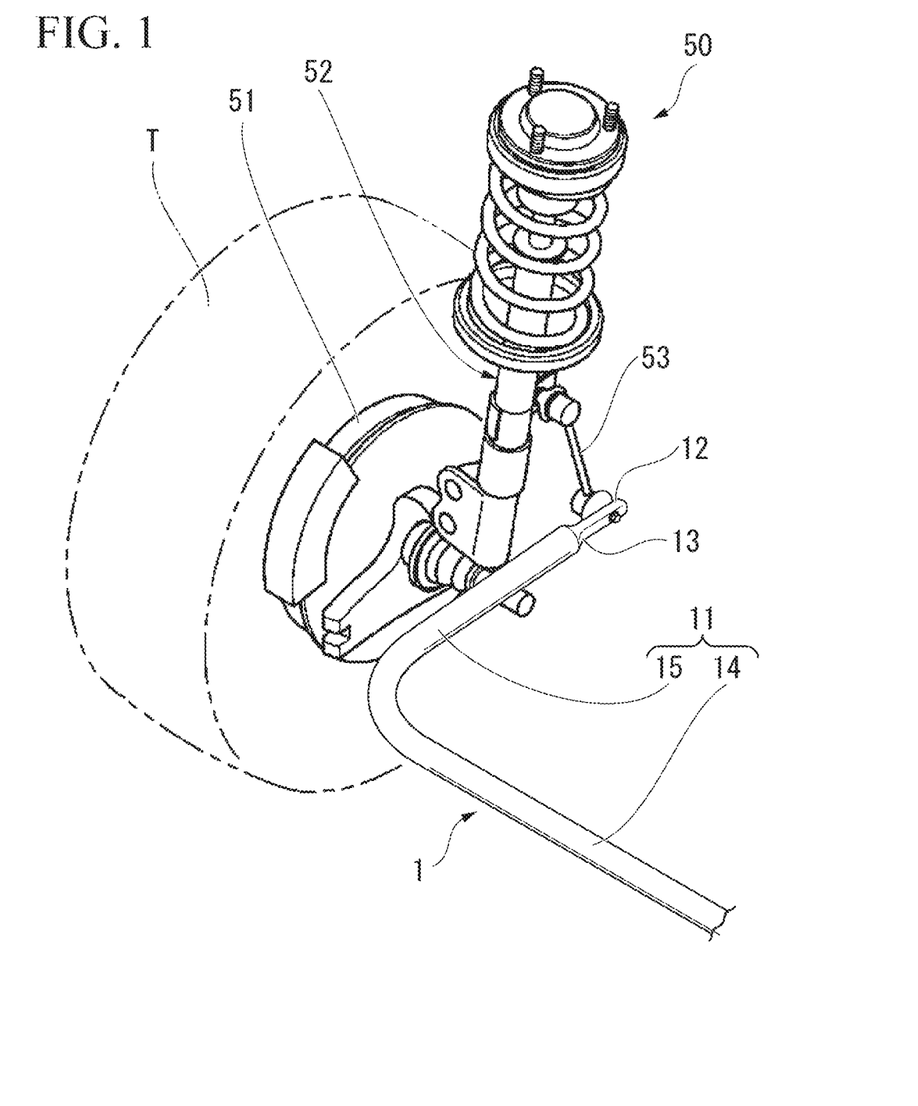
FIG. 1 is a perspective view showing a state in which a stabilizer provided as an embodiment according to the present invention is mounted on a suspension apparatus.
Figure 2A:
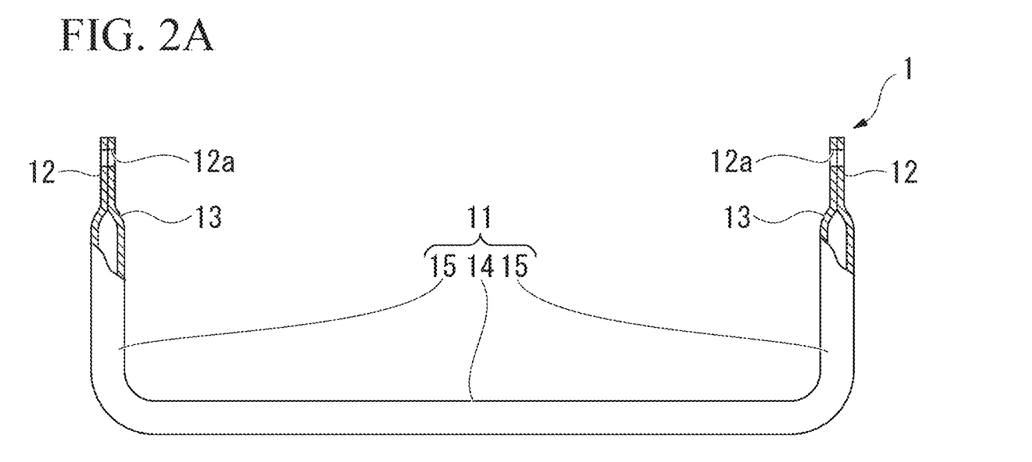
FIG. 2A is a plan view including a partial cross section of the stabilizer shown in FIG. 1.
Figure 2B:
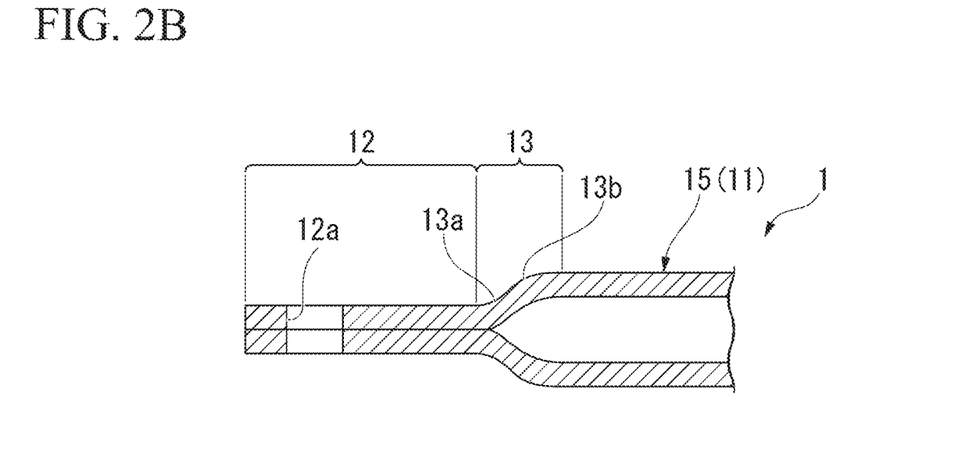
FIG. 2B is a partially enlarged cross-sectional view of the stabilizer shown in FIG. 1.

Hereinafter, an embodiment of a stabilizer according to the present invention will be described with reference to FIG. 1, FIG. 2A and FIG. 2B.

A stabilizer 1 of the embodiment includes a main bar 11, connecting plates 12, and transition sections 13, and connects a pair of left and right suspension apparatuses 50. The main bar 11, the connecting plates 12, and the transition sections 13 are formed integrally with each other. The stabilizer 1 is formed of, for example, a carbon steel material or the like. Further, the pair of suspension apparatuses 50 are not included in the configuration of the stabilizer 1 of the embodiment.

First, the suspension apparatuses 50 will be described.

The suspension apparatus 50 includes a support section 51 configured to rotatably support a wheel T, a shock absorber 52 having a cylinder, a lower end portion of the cylinder being attached to the support section 51, and a stabilizer link 53 configured to connect the cylinder of the shock absorber 52 to the stabilizer 1.

Hereinafter, the stabilizer 1 will be described on the basis of a posture in a state in which the stabilizer 1 is attached to the suspension apparatuses 50.

The main bar 11 includes a torsional section 14 extending in a leftward/rightward direction in the vehicle, and a pair of arm sections 15 extending respectively from both end portions of the torsional section 14 in a leftward/rightward direction toward the rear of the vehicle, and the main bar 11 is formed in an elastically deformable manner. The main bar 11 is formed in a tubular shape. Further, the main bar 11 may be formed in a solid rod shape.

A length of the torsional section 14 is greater than a length of the arm sections 15. An outer circumferential surface of the torsional section 14 extends linearly in the leftward/rightward direction throughout the entire length in the leftward/rightward direction. The outer circumferential surfaces of the arm sections 15 linearly extend in the forward/rearward direction throughout the entire length in the forward/rearward direction. An inner diameter and an outer diameter of the torsional section 14 are respectively equal throughout the entire length of the torsional section 14. Inner diameter and outer diameter of the arm section 15 are respectively equal throughout the entire length of the arm section 15. The inner diameter and the outer diameter of the torsional section 14 are respectively equal to the inner diameters and the outer diameters of the arm sections 15. Connecting portions between the torsional section 14 and the arm sections 15 are bent to protrude outward in the leftward/rightward direction.

Further, the length of the torsional section 14 may be smaller than the length of the arm sections 15. The torsional section 14 and the arm sections 15 may be curved. The inner diameters of the torsional section 14 and the arm sections 15 may be different from each other, and the outer diameters of the torsional section 14 and the arm sections 15 may be different from each other.

The connecting plates 12 linearly protrude rearward from the arm sections 15 of the main bar 11. Further, the connecting plates 12 may protrude while being bent rearward from the arm sections 15 of the main bar 11. The connecting plate 12 is formed in a plate shape, front and back surfaces of which are directed in the leftward/rightward direction in the vehicle. That is, a plate thickness direction of the connecting plate 12 coincides with the leftward/rightward direction of the vehicle in a state in which the stabilizer 1 is attached to the suspension apparatuses 50. The plate thickness direction of the connecting plate 12 according to the embodiment coincides with the leftward/rightward direction in FIG. 2A.

The connecting plate 12 includes a set of flat sections which are formed from tubular rod bodies W compressed in a radial direction and overlap each other. Rear edges of the overlapping surfaces of the set of flat sections are exposed to a rear edge of the connecting plate 12.

A through-hole 12a passing through the connecting plate 12 in the plate thickness direction is formed in the connecting plate 12. The connecting plate 12 is connected to the stabilizer link 53 by screwing a bolt into a nut in a state in which the bolt is inserted through both of the through-hole 12a and a through-hole formed in the stabilizer link 53.

The transition section 13 connects a rear end portion of the arm section 15 of the main bar 11 to a front end portion of the connecting plate 12, and the size (the width) of the transition section 13 in the plate thickness direction of the connecting plate 12 gradually decrease from the front toward the rear. A portion of an outer circumferential surface of a front end portion 13b of the transition section 13 directed in the plate thickness direction is formed in a curved surface shape. A portion of an outer circumferential surface of a rear end portion 13a of the transition section 13 directed in the plate thickness direction are formed in a convex curved surface shape. An internal space communicating with the inside of the main bar 11 is provided in the transition section 13 throughout the entire region except the rear edge of the transition section 13. The size of the internal space in the plate thickness direction is gradually reduced from the front end portion 13b of the transition section 13 toward the rear end portion 13a of the transition section 13. A front end portion of the internal space of the transition section 13 is connected to the inside of the rear end portion of the arm section 15 without a step. Further, the transition section 13 may be solid.

Central sections of the arm section 15, the transition section 13, and the connecting plate 12 in the plate thickness direction are in line with each other.

In the above-mentioned configuration, for example, when the vehicle turns or the like, the stabilizer 1 minimizes displacement of the vehicle in the roll direction since the stabilizer is elastically deformed when the displacement amounts of the pair of left and right shock absorbers 52 are different from each other.

Then, in the embodiment, a minimum value of the Vickers hardness of the transition section 13 is 200 HV or more, and preferably 250 HV or more and 400 HV or less.

A minimum value of the Vickers hardness of the connecting plate 12 is 150 HV or more and 500 HV or less. An outer diameter of a rear end portion of the arm section 15 of the main bar 11 (an end portion of the main bar) is 2.5 times or more and 10 times or less, and preferably 2.5 times or more and 8 times or less a thickness of the connecting plate 12 (a thickness in the plate thickness direction). The thickness of the connecting plate 12 (twice the plate thickness) is, for example, 4.0 mm or more and 16.0 mm or less, and a diameter of the rear end portion of the arm section 15 of the main bar 11 is, for example, 10.0 mm or more and 56.0 mm or less.

Next, a method of manufacturing the stabilizer 1 configured as described above will be described.

First, the entirety of the tubular rod body W that extends linearly is heated to a temperature of less than an A1 transformation point to perform bending processing, and sections 15w intended to be formed into the arm sections, sections 13w intended to be formed into the transition sections and sections 12w intended to be formed into the connecting sections are formed while the torsional section 14 is formed. Here, the sections 15w, 13w and 12w intended to be respectively formed into the arm sections, the transition sections, and the connecting sections extend linearly in a direction perpendicular or inclined to an extension direction of the torsional section 14. Next, the entire rod body W is heated to a temperature of the A1 transformation point or more to perform quenching through, for example, resistance heating or the like.

Figure 3A:
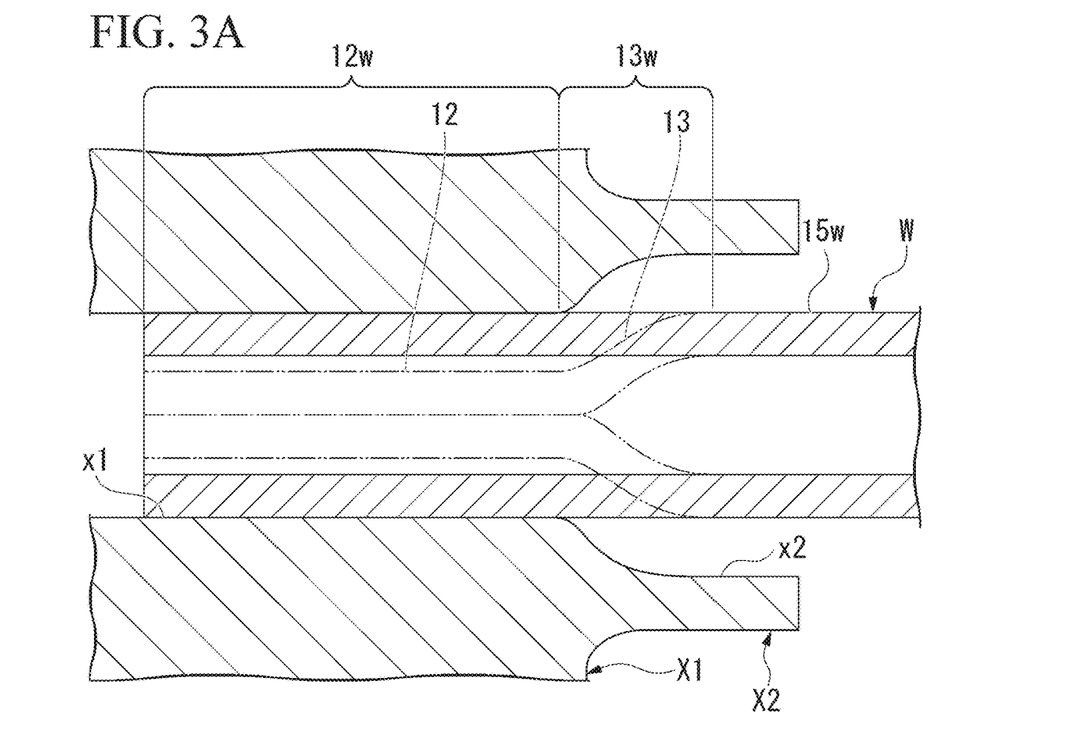
FIG. 3A is a view showing a method of manufacturing a stabilizer provided as a first embodiment according to the present invention.
Figure 3B:
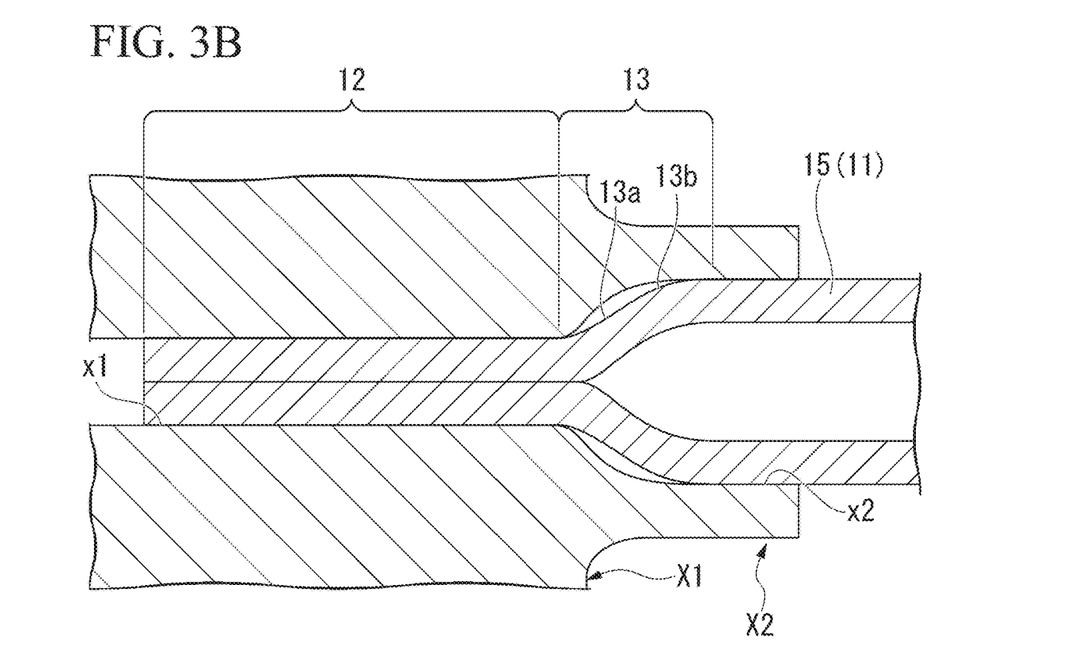
FIG. 3B is a view showing the method of manufacturing the stabilizer provided as the first embodiment according to the present invention.

Then, the section 12w intended to be formed into the connecting plate and the section 13w intended to be formed into the transition section are heated to a temperature of the A1 transformation point or more using, for example, a high frequency coil or the like (a heating process). Next, as shown in FIG. 3A and FIG. 3B, forging processing is performed on the section 12w intended to be formed into the connecting plate and the connecting plate 12 is molded (a forging process). Here the section 13w intended to be formed into the transition section is deformed to be formed into the transition section 13 following the molding of the connecting plate 12 through forging.

Then, in the embodiment, during the forging process, the connecting plate 12 is molded while the section 13w intended to be formed into the transition section is cooled.

In the example shown, during the forging process, the section 13w intended to be formed into the transition section is cooled by bringing cooling bodies X2 having temperatures lower than that of the section 13w intended to be formed into the transition section into contact with at least connecting portion of the section 15w intended to be formed into the arm section of the rod body W to the section 13w intended to be formed into the transition section. The highest temperature on abutting surfaces x2 of the cooling bodies X2, which abut the section 15w intended to be formed into the arm section, immediately before the abutting surfaces x2 abut the section 15w intended to be formed into the arm section is lower than a lowest temperature on the section 13w intended to be formed into the transition section.

The cooling bodies X2 are provided on forging molds X1, and protrude from the forging molds X1 toward the section 15w intended to be formed into the arm section. The cooling bodies X2 are formed integrally with the forging molds X1. The volumes of the cooling bodies X2 are smaller than that of the forging molds X1.

The abutting surfaces x2 of the cooling bodies X2 are farther away from the rod body W than abutting surfaces x1 of the forging molds X1 that abut the section 12w intended to be formed into the connecting plate. Accordingly, during the forging process, first, as shown in FIG. 3A, the abutting surfaces x1 of the forging molds X1 abut the section 12w intended to be formed into the connecting plate, and push the section 12w intended to be formed into the connecting plate. After that, as shown in FIG. 3B, the abutting surfaces x2 of the cooling bodies X2 abut the section 15w intended to be formed into the arm section (see FIG. 3A). That is, FIG. 3A shows a state in which the abutting surfaces x1 of the forging molds X1 abut the section 12w intended to be formed into the connecting plate, and FIG. 3B shows a state in which the abutting surfaces x1 of the forging molds X1 push and deform the section 12w intended to be formed into the connecting plate, and the connecting plate 12 is molded after FIG. 3A.

Here, during the forging process, as shown in FIG. 3A, in a state in which the abutting surfaces x1 of the forging molds X1 abut the section 12w intended to be formed into the connecting plate and the abutting surfaces x2 of the cooling bodies X2 are apart from the section 15w intended to be formed into the arm section, heat from at least the section 12w intended to be formed into the connecting plate, which is heated during the heating process is transferred to the abutting surfaces x1 of the forging molds X1. For this reason, the highest temperature on the abutting surfaces x2 of the cooling bodies X2 is lower than the lowest temperature on the abutting surfaces x1 of the forging molds X1.

Accordingly, during the forging process, the abutting surfaces x2 of the cooling bodies X2 having temperatures lower than those of the forging molds X1 abut the section 15w intended to be formed into the arm section while the abutting surfaces x1 of the forging molds X1 push the section 12w intended to be formed into the connecting plate. Here, not only the section 13w intended to be formed into the transition section but also the section 12w intended to be formed into the connecting plate is cooled by the cooling bodies X2. Further, the section 12w intended to be formed into the connecting plate may not be cooled by the cooling bodies X2.

During the forging process, the forging molds X1 come into contact with the connecting portion of the section 13w intended to be formed into the transition section to the section 12w intended to be formed into the connecting plate, and the forging molds X1 and the cooling bodies X2 do not come into contact with other portions of the section 13w intended to be formed into the transition section. During the forging process, the rod body W is surrounded by the forging molds X1 and the cooling bodies X2 throughout the entire circumference of the rod body W. Further, during the forging process, the forging molds X1 or the cooling bodies X2 may come into contact with the entire region of the section 13w intended to be formed into the transition section.

Next, the through-hole 12a is formed on the connecting plate 12, or the connecting plate 12 is cut into a desired shape.

As described above, in the stabilizer 1 according to the embodiment, since the minimum values of the Vickers hardness of the transition sections 13 are 200 HV or more, differences in hardness between the transition sections 13 and the connecting plates 12 are minimized. For this reason, when the vehicle having the stabilizer 1 in which the connecting plates 12 are connected to the suspension apparatuses 50 travels, even when stress is concentrated on the connecting portions between the connecting plates 12 and the transition sections 13, damage on the connecting portions can be minimized.

In addition, the minimum values of the Vickers hardness of the connecting plates 12 are 150 HV or more, and the outer diameters of the rear end portions of the arm sections 15 of the main bar 11 are 2.5 times or more and 10 times or less the thicknesses of the connecting plates 12. For this reason, when the vehicle having the stabilizer 1 in which the connecting plates 12 are connected to the suspension apparatuses 50 travels while differences in hardness between the transition sections 13 and the connecting plates 12 are minimized, even though the stress is concentrated on the connecting portions between the connecting plates 12 and the transition sections 13, damage on the connecting portions can be reliably minimized.

When the minimum values of the Vickers hardness of the connecting plates 12 are less than 150 HV, since the hardness of the connecting plates 12 is lowered, loads applied to the connecting portions between the connecting plates 12 and the transition sections 13 are increased, and it is difficult to minimize damage on the connecting portions.

When the outer diameters of the rear end portions of the arm sections 15 of the main bar 11 are less than 2.5 times the thicknesses of the connecting plates 12, since the hardness of the connecting plates 12 is reduced, loads applied to the connecting portions between the connecting plates 12 and the transition sections 13 are increased, and it is difficult to minimize damage to the connecting portions.

When the outer diameters of the rear end portions of the arm sections 15 of the main bar 11 exceed 10 times the thicknesses of the connecting plates 12, for example, it is difficult to form the connecting plates 12 through forging, and manufacturing costs may be increased.

In addition, according to the method of manufacturing the stabilizer 1 according to the embodiment, the connecting plate 12 is molded while the section 13w intended to be formed into the transition section is cooled during the forging process, the section 13w intended to be formed into the transition section being heated to the temperature of the A1 transformation point or more during the heating process. For this reason, the transition section 13 is rapidly cooled and quenching can be performed on the transition section 13 at the same time the connecting plate 12 is molded through forging, and hardness of the transition section 13 can be increased. Accordingly, it is possible to obtain the stabilizer 1 in which the connecting portion between the connecting plate 12 and the transition section 13 is hard to be damaged. Moreover, since quenching can be performed on the transition sections 13 during the forging process performed in the related art, a decrease in production efficiency can be prevented.

In addition, in the embodiment, the rod body W is formed in a tubular shape, the section 12w intended to be formed into the connecting plate is compressed in the radial direction during the forging process, and the inner circumferential surface of the section 12w intended to be formed into the connecting plate is molded as a set of surfaces that overlap each other. For this reason, when the connecting plate 12 is cooled, it is conceivable that a gap is generated between the set of surfaces.

However, during the forging process, since the connecting plate 12 is constrained in the plate thickness direction of the connecting plate 12 by the forging molds X1, in this process, even if not only the section 13w intended to be formed into the transition section but also the molded connecting plate 12 is cooled, formation of the gap can be minimized.

In addition, during the forging process, since not only the transition section 13 but also the connecting plate 12 is rapidly cooled, the quenching is also performed on the connecting plate 12, and hardness of the connecting plate 12 can be increased. Accordingly, in a state in which a bolt attached to the stabilizer 1 are inserted through the through-hole 12a of the connecting plate 12, formation of cracks in the inner circumferential surface of the through-hole 12a can be minimized.

In addition, during the forging process, when the section 13w intended to be formed into the transition section is cooled, since the cooling bodies X2 contact at least the section 15w of the rod body W intended to be formed into the arm section that cannot be easily relatively deformed, it is possible to prevent contacting states of the cooling bodies X2 with respect to the rod body W from being different for each forged rod body W. In addition, here, since the cooling bodies X2 contact the connecting portion of the section 15w intended to be formed into the arm section to the section 13w intended to be formed into the transition section, it is possible to minimize distances between the cooling bodies X2 and the section 13w intended to be formed into the transition section, and the section 13w intended to be formed into the transition section can be effectively cooled.

In addition, since the cooling bodies X2 are provided on the forging molds X1, the cooling bodies X2 and the forging molds X1 can be driven integrally during the forging process, and complication of the forging mold apparatus can be minimized.

Further, the cooling bodies X2 may be separated from the forging molds X1, and may be formed of the same material as the material that forms the forging molds X1 or may be formed of a different material. In addition, the volumes of the cooling bodies X2 may be equal to or greater than the volumes of the forging molds X1.

Next, a second embodiment according to the present invention will be described with reference to FIG. 4A and FIG. 4B, but a basic configuration thereof is the same as that of the first embodiment. For this reason, components which are the same are designated by the same reference signs, description thereof will be omitted, and only different points will be described.

In the method of manufacturing the stabilizer 1 according to this embodiment, during the forging process, the connecting plate 12 is molded while the section 13w intended to be formed into the transition section is cooled by cooling the forging molds X1.

Figure 4A:
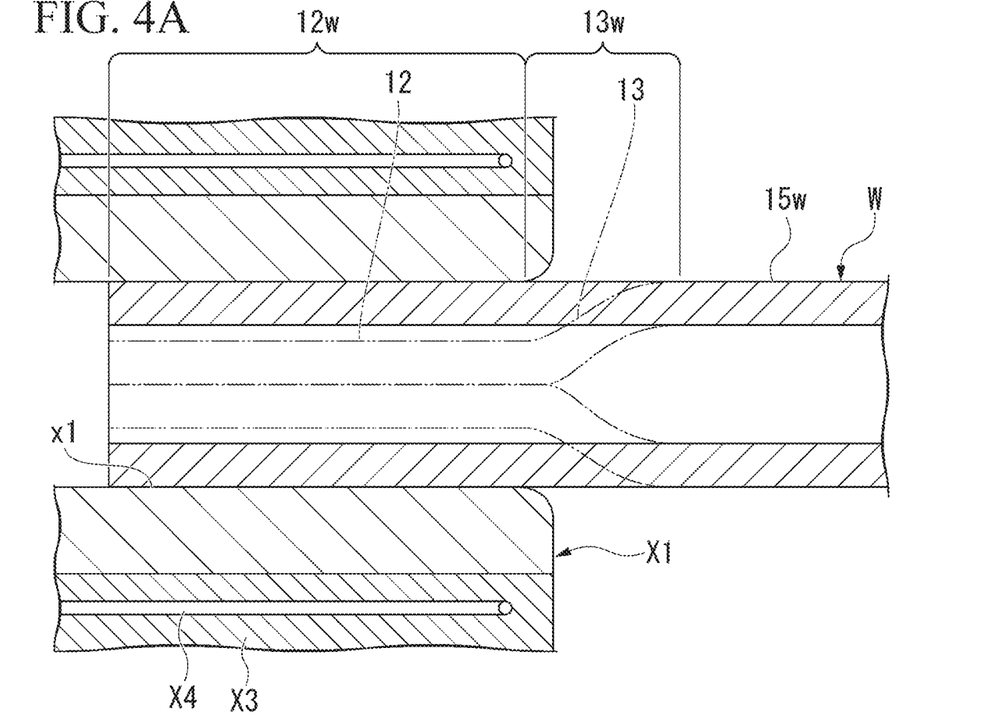
FIG. 4A is a view showing a method of manufacturing a stabilizer provided as a second embodiment according to the present invention.
Figure 4B:
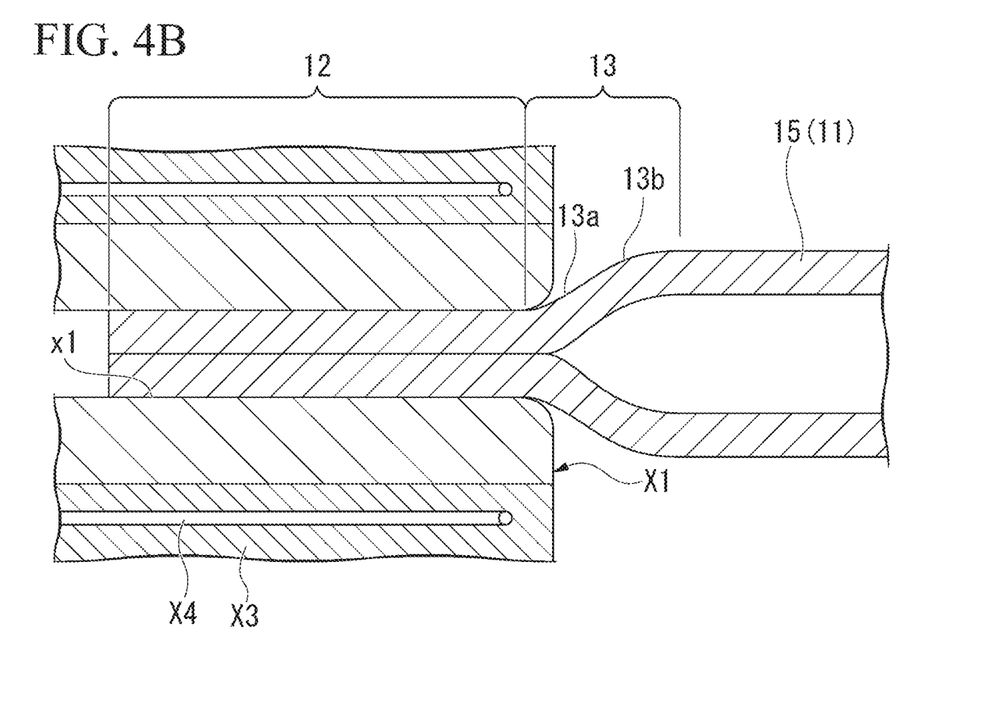
FIG. 4B is a view showing the method of manufacturing the stabilizer provided as the second embodiment according to the present invention.

As shown in FIG. 4A and FIG. 4B, the forging molds X1 are mounted on outer frame bodies X3, and passages X4 through which coolant flows are formed in the outer frame bodies X3. Then, during the forging process, the connecting plate 12 is molded while the section 13w intended to be formed into the transition section is cooled by causing the coolant to flow through the passages X4 and cooling the forging molds X1 via the outer frame bodies X3. Further, FIG. 4A shows a state in which the abutting surfaces x1 of the forging molds X1 abut the section 12w intended to be formed into the connecting plate, and FIG. 4B shows a state in which the abutting surfaces x1 of the forging molds X1 push and deform the section 12w intended to be formed into the connecting plate, and the connecting plate 12 is molded after FIG. 4A.

According to the method of manufacturing the stabilizer 1 according to the embodiment, during the forging process, the section 13w intended to be formed into the transition section is cooled by cooling the forging molds X1 that mold the connecting plate 12. For this reason, even when heat of the sections 12w and 13w respectively intended to be formed into the connecting plate and the transition section is transferred to the forging molds X1, the heat can be cooled to keep the temperatures of the forging molds X1 equal. Accordingly, it is possible to prevent the temperature after cooling of the section 13w intended to be formed into the transition section during the forging process from being different for each forged rod body W, and hardness of the transition section 13 can be equalized for each manufactured stabilizer 1.

Further, the passages X4 may be formed in the forging molds X1. In addition, in the method of manufacturing the stabilizer 1 according to this embodiment, the connecting plate 12 may be molded using the forging molds X1 on which the cooling bodies X2 are disposed. In this case, the section 13w intended to be formed into the transition section is cooled by not only the forging molds X1 cooled by the coolant but also the cooling bodies X2, and the section 13w intended to be formed into the transition section can be more reliably cooled. In addition, the forging molds X1 may be cooled by blowing gas onto the forging molds X1.

Next, a verification test of the actions described above will be described.

Two types of stabilizers were manufactured as a practical example and a comparative example. The two types of stabilizers having the same shape and the same size were manufactured using the rod bodies W having the same configurations. In both of the practical example and the comparative example, the outer diameters of the rear end portions of the arm sections 15 of the main bar 11 were about 20.7 mm, and the thicknesses of the connecting plates 12 were about 5.6 mm (about 2.8 mm×2).

The stabilizer 1 according to the practical example was manufactured through the manufacturing method according to the first embodiment, and the stabilizer according to the comparative example was manufactured in a state in which coolant was discharged from the passages X4 in the manufacturing method according to the second embodiment.

Figure 5:
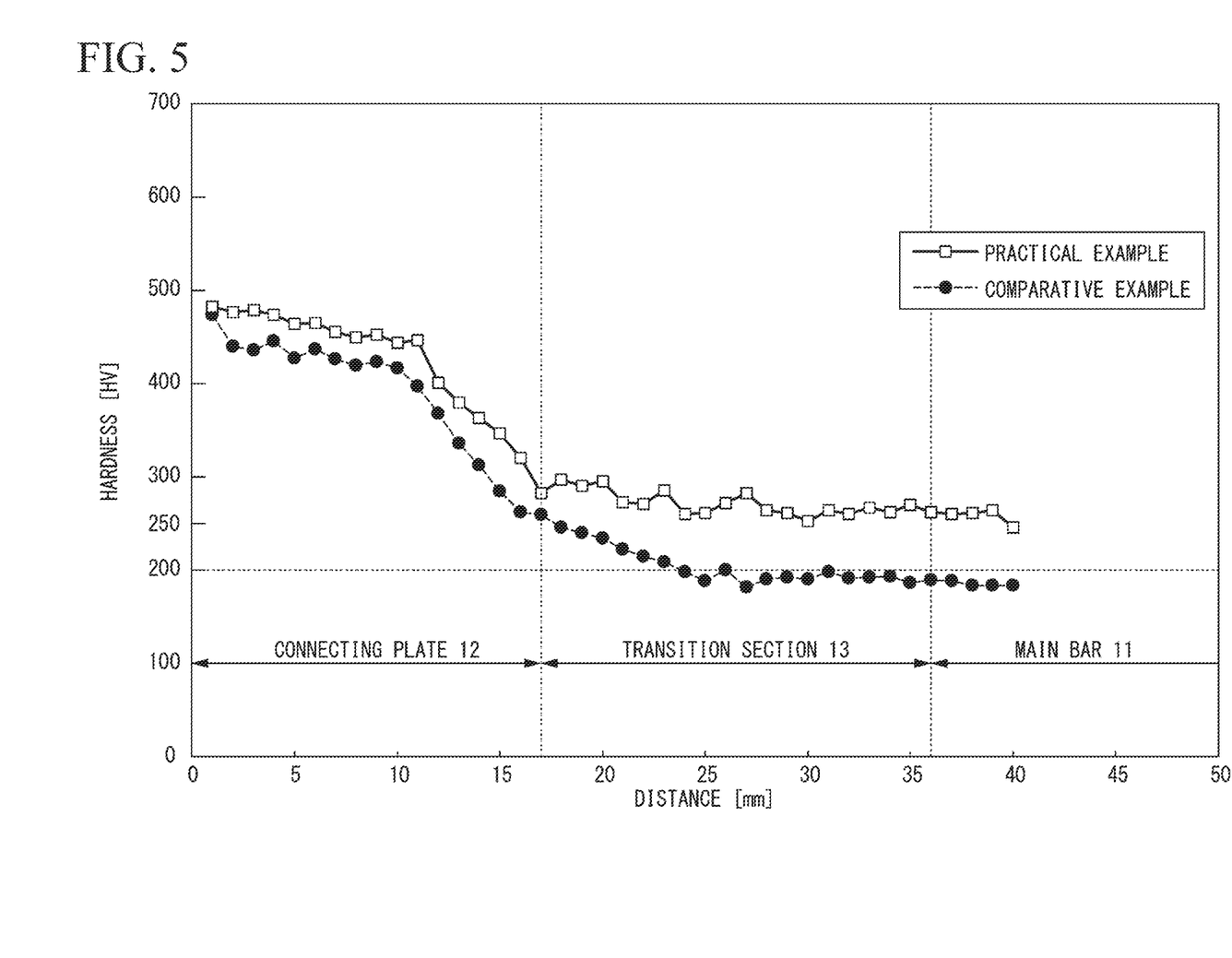
FIG. 5 is a graph showing hardness of stabilizers of a practical example and a comparative example according to the present invention.

Then, in each of the obtained stabilizers, the Vickers hardness was measured at a plurality of places from an end portion of the opening circumferential edge portion of the through-hole 12a in the surface of the connecting plate 12 on the side of the transition section 13, i.e., the front end portion, to a rear end portion of the arm section 15 in the forward direction. The results are shown in FIG. 5. In the graph of FIG. 5, 0 mm on a horizontal axis is a portion of the surface of the connecting plate 12 connected to a front end of the inner circumferential surface of the through-hole 12a, and the lateral axis indicates the distance from the 0 mm portion toward the front.

The results indicate that a minimum value of the Vickers hardness of the transition section 13 was 200 HV or more in the practical example and the minimum value of the Vickers hardness of the transition section was smaller than 200 HV in the comparative example.

Further, the technical scope of the present invention is not limited to the embodiment and various modifications may be made without departing from the spirit of the present invention.

For example, the stabilizer may be formed using a solid rod body.

In addition, for example, the connecting plates 12 may protrude from the arm sections 15 of the main bar 11 on the sides of in the leftward/rightward direction, and the configuration of the stabilizer may be appropriately modified.

In addition, during the forging process, the coolant may come into direct contact with the section 13w intended to be formed into the transition section. As the coolant, for example, a liquid, a gas, or the like, may be exemplified, and in the case of a liquid, for example, the liquid may be appropriately modified into a mist, a shower, a straight form, or the like.

In addition, the components in the above-mentioned embodiments can be appropriately substituted with known components without departing from the spirit of the present invention and the above-mentioned variants may be appropriately combined.

INDUSTRIAL APPLICABILITY

The present invention can be used in a stabilizer provided in a vehicle, and a method of manufacturing a stabilizer.

What is claimed is:

1. A stabilizer comprising:
a main bar that is elastically deformable;
a pair of connecting plates respectively configured to be connected to a pair of left and right suspension apparatuses; and
transition sections connecting end portions of the main bar and the pair of connecting plates, a size of one transition section of the transition sections in a plate thickness direction of one connecting plate of the connecting plates gradually decreasing from the main bar toward the connecting plate,
wherein a minimum value of the Vickers hardness of the transition section is 200 HV or more, and
a maximum value of the Vickers hardness of the transition section is smaller than a maximum value of the Vickers hardness of the connecting plate.

2. The stabilizer according to claim 1, wherein a minimum value of the Vickers hardness of the connecting plate is 150 HV or more, and
outer diameters of the end portions of the main bar are 2.5 times or more and 10 times or less thicknesses of the connecting plates.

3. The stabilizer according to claim 1, wherein thicknesses of the connecting plates in the plate thickness direction are twice a plate thickness of the main bar and the transition section.

4. A method of manufacturing a stabilizer, the stabilizer comprising:
a main bar that is elastically deformable;
a pair of connecting plates respectively configured to be connected to a pair of left and right suspension apparatuses; and
transition sections connecting end portions of the main bar and the pair of connecting plates, a size of one transition section of the transition sections in a plate thickness direction of one connecting plate of the connecting plates gradually decreasing from the main bar toward the connecting plate,
the method comprising:
a heating process of heating sections of a rod body intended to be respectively formed into the connecting plate and the transition section to a temperature of an A1 transformation point or more; and
a forging process of molding the connecting plate by performing forging on the section intended to be formed into the connecting plate,
wherein the connecting plate is molded while the section intended to be formed into the transition section is cooled during the forging process.

5. The method of manufacturing the stabilizer according to claim 4, wherein, during the forging process, the section intended to be formed into the transition section is cooled by bringing cooling bodies, having temperatures lower than that of the section intended to be formed into the transition section, into contact with at least a connecting portion of a section intended to be formed into the main bar of the rod body to the section intended to be formed into the transition section.

6. The method of manufacturing the stabilizer according to claim 5, wherein the cooling bodies are provided on forging molds that mold the connecting plate, and protrude from the forging molds toward the section intended to be formed into the main bar.

7. The method of manufacturing the stabilizer according to claim 4, wherein, during the forging process, the section intended to be formed into the transition section is cooled by cooling forging molds that mold the connecting plate.

8. The method of manufacturing the stabilizer according to claim 7,
wherein the forging molds are mounted on outer frame bodies,
passages through which coolant flows are formed in the outer frame bodies, and
during the forging process, the section intended to be formed into the transition section is cooled by causing the coolant to flow through the passages and cooling the forging molds via the outer frame bodies.

* * * * *